(12) United States Patent
Ruch et al.

(10) Patent No.: US 10,222,133 B2
(45) Date of Patent: Mar. 5, 2019

(54) HEAT EXCHANGE DEVICE

(71) Applicant: International Business Machines Corporation, Armonk, NY (US)

(72) Inventors: Patrick Ruch, Jenins (CH); Sarmenio Saliba, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 14/700,784

(22) Filed: Apr. 30, 2015

(65) Prior Publication Data

US 2016/0320144 A1    Nov. 3, 2016

(51) Int. Cl.
| | |
|---|---|
| *F28D 20/00* | (2006.01) |
| *B01J 20/28* | (2006.01) |
| *C25D 11/04* | (2006.01) |
| *C25D 11/24* | (2006.01) |
| *C25D 11/26* | (2006.01) |
| *F28F 13/00* | (2006.01) |

(52) U.S. Cl.
CPC ...... *F28D 20/003* (2013.01); *B01J 20/28004* (2013.01); *C25D 11/045* (2013.01); *C25D 11/24* (2013.01); *C25D 11/246* (2013.01); *C25D 11/26* (2013.01); *F28F 13/003* (2013.01); *Y02E 60/142* (2013.01)

(58) Field of Classification Search
CPC .. F28D 20/003; F28D 21/0015; F28F 13/003; F28F 13/04; F28F 13/18; F28F 13/182; F28F 13/185; F28F 13/187; F28F 21/084; F28F 21/086; F28F 2245/06; F25B 37/00; F25B 35/00; C25D 11/26; C25D 11/246; C25D 11/045; C25D 11/24; B01J 20/28004; Y02E 60/142
See application file for complete search history.

(56) References Cited

U.S. PATENT DOCUMENTS

| | | | | |
|---|---|---|---|---|
| 2,766,119 A | * | 10/1956 | Freedman | C25D 11/04 205/201 |
| 3,574,071 A | * | 4/1971 | Covino | A47J 36/02 205/118 |
| 4,060,125 A | * | 11/1977 | Fujie | F28F 13/187 165/133 |

(Continued)

OTHER PUBLICATIONS

Scotti et al., "A micro heat exchanger microfabricated from bulk aluminum," Journal of Physics: Conference Series vol. 557, Issue 1 (2014) 012069. IOP Publishing; http://iopscience.iop.org/1742-6596/557/1/012069; last printed Apr. 28, 2015.

(Continued)

*Primary Examiner* — Orlando E Aviles Bosques
*Assistant Examiner* — Jose O Class-Quinones
(74) *Attorney, Agent, or Firm* — Scully, Scott, Murphy & Presser, P.C.; Daniel Morris, Esq.

(57) ABSTRACT

A heat exchange device having a thermally conductive substrate, an intermediate layer, and an adsorbent material. The intermediate layer at least partially covers the thermally conductive substrate. A plurality of openings is formed at a surface of the intermediate layer. The openings have an elongated shape in a direction from an outer surface of the intermediate layer towards the thermally conductive substrate, and the adsorbent material at least partially fills the plurality of openings.

11 Claims, 7 Drawing Sheets

(56) References Cited

U.S. PATENT DOCUMENTS

| | | | | |
|---|---|---|---|---|
| 4,784,732 | A * | 11/1988 | Covino | C25D 11/06 |
| | | | | 205/106 |
| 5,035,282 | A * | 7/1991 | Kawashita | F28D 1/0478 |
| | | | | 165/133 |
| 5,833,931 | A * | 11/1998 | Fromson | B01D 53/885 |
| | | | | 165/133 |
| 6,142,222 | A | 11/2000 | Kang et al. | |
| 6,562,103 | B2 * | 5/2003 | Sethna | B01D 53/047 |
| | | | | 75/496 |
| 7,527,677 | B2 * | 5/2009 | Saito | B01D 53/02 |
| | | | | 252/190 |
| 7,871,578 | B2 | 1/2011 | Schmidt | |
| 8,152,047 | B2 | 4/2012 | Rottmann | |
| 2007/0028588 | A1 * | 2/2007 | Varanasi | F28F 13/187 |
| | | | | 60/39.5 |
| 2008/0258598 | A1 | 10/2008 | Shuy | |
| 2010/0242863 | A1 | 9/2010 | Hubau et al. | |
| 2012/0025134 | A1 * | 2/2012 | Feng | B01D 53/62 |
| | | | | 252/184 |
| 2014/0238071 | A1 | 8/2014 | Brunschwiler et al. | |

OTHER PUBLICATIONS

Harris et al., "Design and Fabrication of a Cross Flow Micro Heat Exchanger," Journal of Microelectromechanical Systems, vol. 9, Issue 4, Dec. 2000, pp. 502-508; http://ieeexplore.ieee.org/xpl/articleDetails.jsp?tp=&arnumber=896772&queryText%3Dfabricating+heat+exchanger.

Wang et al., "Heat Transfer Enhancement of the Adsorber of an Adsorption Heat Pump," Adsorption 5, Springer, May 1999, vol. 5, Issue 3, pp. 279-286; http://link.springer.com/article/10.1023%2FA%3A1008964013879.

* cited by examiner (5A) (5B) (5C) (5D)

HEAT EXCHANGE DEVICE

BACKGROUND

The invention relates to a heat exchange device and to a method for manufacturing a heat exchange device.

Heat exchangers refer to devices facilitating a heat transfer from one medium to another. Some heat exchangers employ adsorption processes, wherein adsorption is a reversible process by which gas or liquid molecules are fixed onto a solid matrix, typically a surface of a porous material. Physical adsorption processes are mainly based on van der Waals forces between the adsorbate molecules and the adsorbent surface. In particular, a large specific surface area of the adsorbent material can favor an adsorption capacity.

During adsorption of the adsorbate molecules heat is released in an exothermic process. The concept of adsorption heat and mass exchange can be utilized, for example, in thermochemical heat pumps and chillers. Conventional heat exchangers employing adsorption processes include, for example, fixed-bed systems, adsorbent coatings fixed by a binder, locally synthesized adsorbents, etc.

BRIEF SUMMARY OF THE INVENTION

According to a first aspect, the invention can be embodied as a heat exchange device. The heat exchange device comprises a thermally conductive substrate, an intermediate layer and an adsorbent material. The intermediate layer at least partially covers the thermally conductive substrate. A plurality of openings are formed at a surface of the intermediate layer. The openings have an elongated shape in a direction from an outer surface of the intermediate layer towards the thermally conductive substrate, and the adsorbent material at least partially fills the plurality of openings.

According to a second aspect, the invention can be embodied as a method for manufacturing a heat exchange device. The method comprises: providing a thermally conductive substrate, passivating the thermally conductive substrate for forming an intermediate layer and filling at least one of the plurality of openings with an adsorbent material.

According to another aspect, the invention can be embodied as a heat exchange device that is manufactured according to the aforementioned method.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

According to embodiments of the invention, a plurality of openings can be formed at a surface of an intermediate layer with a density of at least 1 opening per $\mu m^2$ and at most 400 openings per $\mu m^2$. A ratio of an opening fraction to a solid fraction at the surface of the intermediate layer can be between 0.1 and 0.9. The openings can be oriented perpendicular to a surface of a thermally conductive substrate within a tolerance of 40°.

According to embodiments of the invention, the substrate is preferably a thermally conductive substrate. At a temperature of 0° C.-40° C. and a pressure of 0.9-1.1 bar, thermally conductive materials can have a thermal conductivity of at least 1 W/mK and preferably at least 10 W/mK. For example, thermal conductivity of materials can be determined by laser flash analysis method, transient plane source method, modified transient plane source method, transient line source method, time-domain thermo-reflectance method or 3ω method and can be based on the Fourier's law for heat conduction. Thermally conductive materials are capable of transferring heat across its body at a higher rate than thermally non-conductive materials.

According to embodiments of the invention, a porous layer can act as an intermediate layer. The porous layer can have a plurality of pores that acts as a plurality of openings to be filled by an adsorbent material. A pore can be an opening having a lateral extension along a top surface of the porous layer and an axial extension along a direction perpendicular to the top surface of the porous layer. In particular, the axial extension of the pores can be larger than, in particular at least twice as large as, the lateral extension.

For example, the openings or pores can be visualized by a (scanning) electron microscope imaging method in order to evaluate properties such as the lateral extension of and distance between the openings. For this purpose, an image processing computer program can be applied, for example, to fit a circular, oval or polygonal shape into the images of the openings.

According to embodiments of the invention, at least 50% of openings at a surface of an adsorbent material have a lateral extension of at most 10 nm, preferably at most 5 nm. In particular, the openings at the surface of the adsorbent material can be formed as pores in microporous and mesoporous range according to the International Union of Pure and Applied Chemistry (IUPAC). The lateral extension of the openings can be determined, for example, by the Horvath-Kawazoe method or Saito-Foley method according to DIN 66135-4 and the Barret-Joyner-Halenda method according to DIN 66134.

Figure 1:
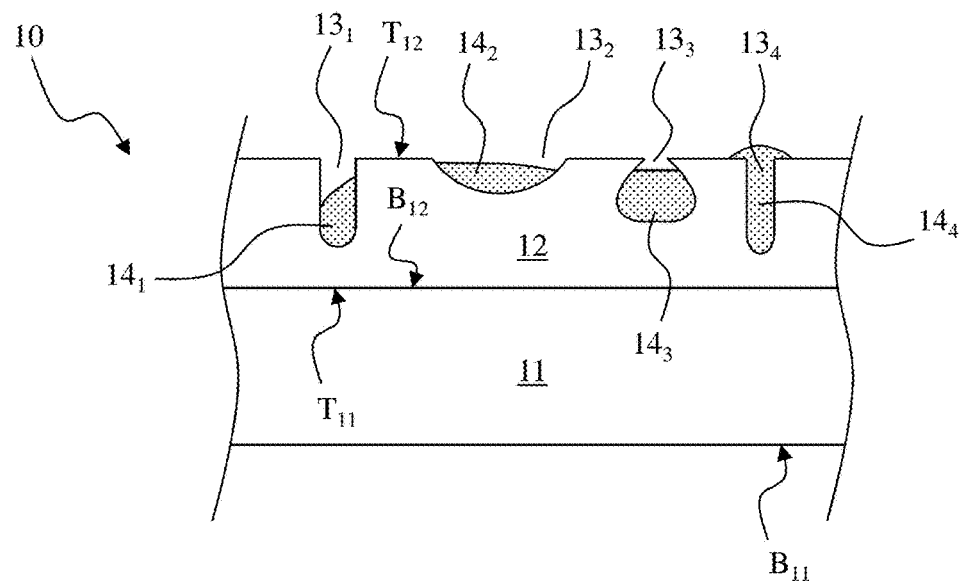
FIG. 1 shows a schematic cross-sectional view of an embodiment of a heat exchange device.

FIG. 1 shows a schematic cross-sectional view of an embodiment of a heat exchange device 10.

The heat exchange device 10 comprises a planar substrate 11. Preferably, the substrate 11 comprises a thermally conductive substrate 11. The substrate 11 has a top surface $T_{11}$ and a bottom surface $B_{11}$ in a horizontal arrangement as shown in FIG. 1. In particular, the top surface $T_{11}$ and the bottom surface $B_{11}$ can be parallel to each other. In particular, the substrate 11 can be configured to extract, store, receive, transfer, deliver or yield heat from and/or to a substance that is in contact with the substrate 11.

Further, the heat exchange device 10 comprises an intermediate layer 12 lying on top of the top surface $T_{11}$ of the substrate 11. In particular, a bottom surface $B_{12}$ of the intermediate layer 12 is at least partially in surface contact with the top surface $T_{11}$ of the substrate 11. The intermediate layer 12 has a top surface $T_{12}$ that can be at least partially parallel to the bottom surface $B_{12}$ of the intermediate layer 12. The top surface $T_{12}$ of the intermediate layer 12 can be regarded as a distal surface, and the bottom surface $B_{12}$ as a proximal layer with respect to the substrate 11.

Figure 14:
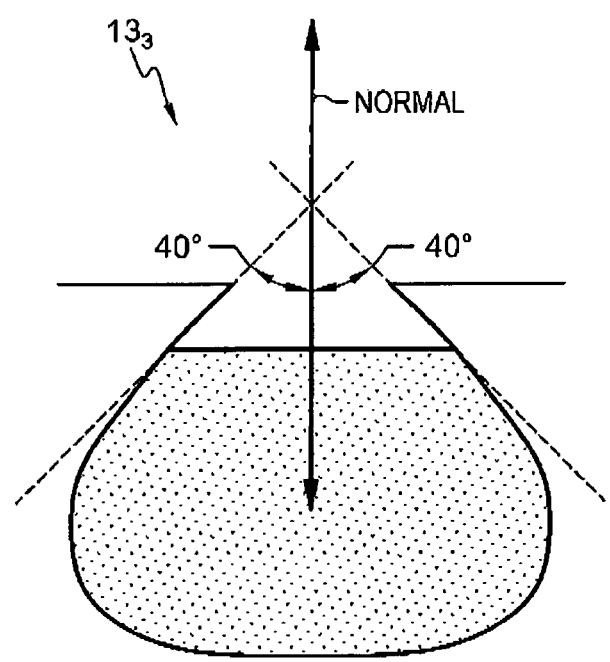
FIG. 14 depicts an example opening of the plurality of openings shown in FIG. 1 oriented perpendicular to a surface of the substrate within a tolerance of 40° in an embodiment.

A plurality of openings $13_1$-$13_4$ are formed at the top surface $T_{12}$ of the intermediate layer 12. Generally, openings in the intermediate layer of a heat exchange device can be randomly shaped and differently shaped from the shapes as shown in FIG. 1, In particular, an opening formed in the intermediate layer 12 can have a top area at the top surface $T_{12}$ of the intermediate layer 12 connected to an elongated body toward the substrate 11. In particular, the top area can have a circular, oval, angular shape or a combination thereof. The elongated body can have a plane, cylindrical, curved, branched, angled shape or a combination thereof. Furthermore, a spatial extension of the elongated body can have a component that is not perpendicular to the top surface $T_{11}$ of the substrate 11, e.g. inclined with respect to the top surface $T_{11}$. For example, FIG. 14 depicts an opening $13_3$ of the plurality of openings shown in FIG. 1 axially extending in a direction having an angle less than 40° with a normal vector that is perpendicular to a surface of the thermally conductive substrate.

For example, the first and the fourth openings $13_1$, $13_4$ are cylindrically shaped, while the second opening $13_2$ is formed as a round recess at the top surface $T_{12}$ of the intermediate layer 12. The third opening $13_3$ can be shaped as an open cavity with a small orifice at the top surface $T_{12}$ and a spherical volume below. In particular, the openings $13_1$, $13_4$ have an elongated shape along a direction that is perpendicular toward the bottom surface $B_{12}$ and the top surface $T_{11}$.

The term "elongated" is to be construed as having a shape that has an extension along a principle or main axis and a lateral extension perpendicular to the main axis. Generally, the extension along the main axis is larger than the extension along a direction transverse to the main axis. For example, bubbles or spherical enclosures in a material generally have a circular shape and are not considered elongated objects.

A lateral extension of the openings $13_1$-$13_4$ relates to a spatial extension of the openings $13_1$-$13_4$ in a direction parallel to the top surface $T_{12}$ of the intermediate layer 12. The lateral extension preferably measures between 10 nm and 1,000 nm. A depth of the openings $13_1$-$13_4$ relates to a spatial extension of the openings $13_1$-$13_4$ from a level of the top surface $T_{12}$ in a direction perpendicular to the top surface $T_{12}$ of the intermediate layer 12. A distance between two neighboring openings $13_1$-$13_4$ relates to a smallest distance between hole tops of two neighboring openings $13_1$-$13_4$ on the top surface $T_{12}$.

The openings $13_1$-$13_4$ are at least partially filled with an adsorbent material $14_1$-$14_4$, respectively. Each of the adsorbent materials $14_1$-$14_4$ can be randomly shaped. For example, the first adsorbent material $14_1$ fills a lower part of the first opening $13_1$ and has a surface that is inclined with respect to the top surface $T_{12}$ of the intermediate layer 12. The second adsorbent material $14_2$, for example, has a spherical top surface. The third adsorbent material $14_3$, for example, has a flat surface that is parallel to the top surface $T_{12}$. The fourth adsorbent material $14_4$ fills the opening $13_4$ completely, and, furthermore, a part of the adsorbent material $14_4$ protrudes the opening $13_4$ on top of the top surface $T_{12}$. In particular, the adsorbent materials $14_1$-$14_4$ can be directly attached to the respective openings $13_1$-$13_4$, i.e. without using a binder or adhesive.

The substrate 11 preferably comprises thermally conductive material and is capable of transferring heat from and to the intermediate layer 12. The substrate 11 comprises a substrate material. In particular, the substrate 11 comprises a metal capable of forming an oxide layer having a plurality of openings at a surface after being passivated. In general, passivation can refer to a process of forming an outer layer of a material that is less susceptible to corrosion. In particular, passivation can involve forming of a metal oxide layer at a surface of a metallic material. For example, the substrate 11 comprises aluminum, aluminum alloy, titanium, titanium alloy. The substrate 11 may also comprise, amongst other examples, an aluminum-titanium alloy, a titanium alloy with aluminum content, or an aluminum alloy with titanium content. Furthermore, the substrate material may include hafnium, niobium, tantalum, tungsten, vanadium or zirconium.

The intermediate layer 12 can comprise an oxidized chemical compound of the substrate material of the substrate 11. For example, the substrate 11 comprises aluminum (Al), and the intermediate layer 12 comprises aluminum oxide ($Al_2O_3$). Preferably, the plurality of openings $13_1$-$13_4$ opens at the top surface $T_{12}$.

The adsorbent materials $14_1$-$14_4$ can comprise a material having a plurality of openings, in particular pores, at its surface. Preferably, the adsorbent materials $14_1$-$14_4$ may comprise a microporous or mesoporous material, i.e. a majority, e.g. at least 50%, of the openings at the surface of the adsorbent materials $14_1$-$14_4$ have a lateral extension of subnanometers to 50 nanometers. Preferably, the adsorbent material has a specific surface area, i.e. a ratio of a total surface area per mass of the material, of greater than 100 $m^2/g$. For example, the adsorbent materials $14_1$-$14_4$ comprise silicates, zeolites, aluminum phosphates, metal-organic frameworks, carbons or salts. In particular, the adsorbent materials $14_1$-$14_4$ can comprise silica gel.

Particles, in particular of a fluid, that come into contact with a surface of the adsorbent materials $14_1$-$14_4$ can adhere to the surface of the adsorbent materials $14_1$-$14_4$. The process is termed adsorption process and can be based on different bounding mechanisms including van der Waals force and chemical bonding and be supported by catalysts present on the surface. During the adsorption process, heat is released that can be transferred from the adsorbent materials $14_1$-$14_4$ through the intermediate layer 12 to the substrate 11, which is in particular thermally conductive. In return, if the thermally conductive substrate 11 is heated, heat can be transferred from the substrate 11 through the intermediate layer 12 to the adsorbent materials $14_1$-$14_4$. For example, a heating the adsorbent materials $14_1$-$14_4$ can result in releasing adsorbed particles from the surface of the adsorbent materials $14_1$-$14_4$.

Figure 2:
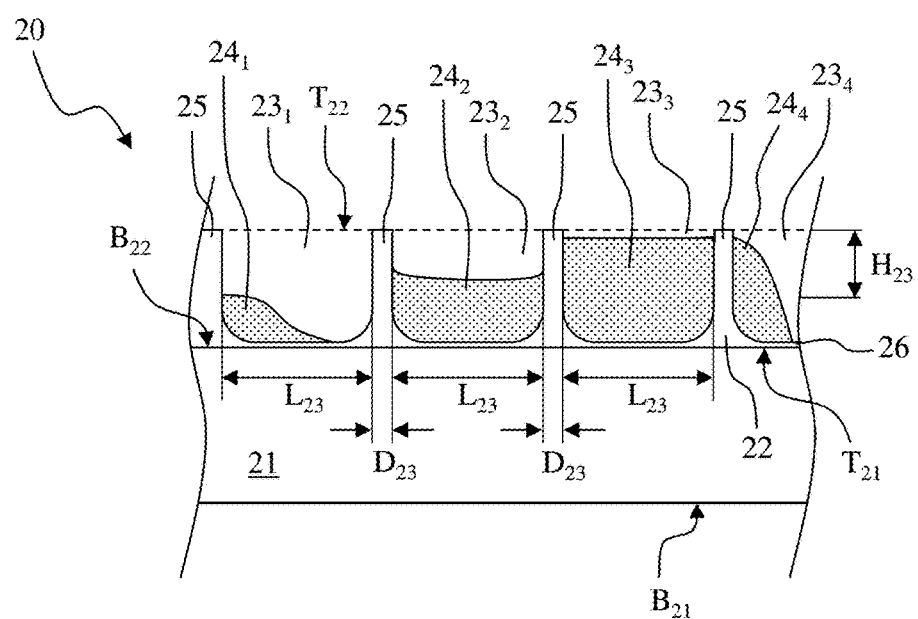
FIG. 2 shows a schematic cross-sectional view of a further embodiment of a heat exchange device.

FIG. 2 shows a schematic cross-sectional view of a further embodiment of a heat exchange device 20.

The heat exchange device 20 comprises a substrate 21, which is in particular a thermally conductive substrate 21, and an intermediate layer 22 placed upon the substrate 21.

The substrate 21 is planar with a top surface $T_{21}$ and a bottom surface $B_{21}$. The intermediate layer 22 has a bottom surface $B_{22}$ that is at least partially in surface contact with the top surface $T_{21}$ of the substrate 21. In particular, the substrate 21 can correspond to the aforementioned substrate 11 from FIG. 1. The intermediate layer 22 can correspond to the intermediate layer 11 from FIG. 1.

In particular, the intermediate layer 22 comprises walls 25 standing on top of a bottom 26. The walls 25 separate a plurality of openings $23_1$-$23_4$ from one another. The plurality of openings $23_1$-$23_4$ is at least partially filled with adsorbent materials $24_1$-$24_4$. In particular, the openings $23_1$-$23_4$ can have a similar, in particular uniform, shape. For example, the openings $23_1$-$23_4$ can have a cylindrical shape with a round top area and an elongated body toward the substrate 21. The adsorbent materials $24_1$-$24_4$ inside the respective openings $23_1$-23 can be shaped randomly, as shown in FIG. 2. Further, the openings $23_1$-$23_4$ can have a similar lateral extension $L_{23}$ and a similar distance $D_{23}$ between two neighboring openings $23_1$-$23_4$. For example, the lateral extension $L_{23}$ can measure between 10 nm and 1,000 nm, and the distance $D_{23}$ between two neighboring openings can vary between 20 nm and 2,000 nm. Alternatively or additionally, the openings $23_1$-$23_4$ can have a similar depth $H_{23}$. For example, the depth $H_{23}$ of the openings $23_1$-$23_4$ can be between 10 nm and 2,000 nm.

In FIG. 2, a ratio of a hollow volume, i.e. a sum of inner volumes of the openings $23_1$-$23_4$, to a combined volume of the intermediate layer 22 and the thermally conductive substrate 21 can be increased with respect to the first embodiment shown in FIG. 1.

Figure 3:
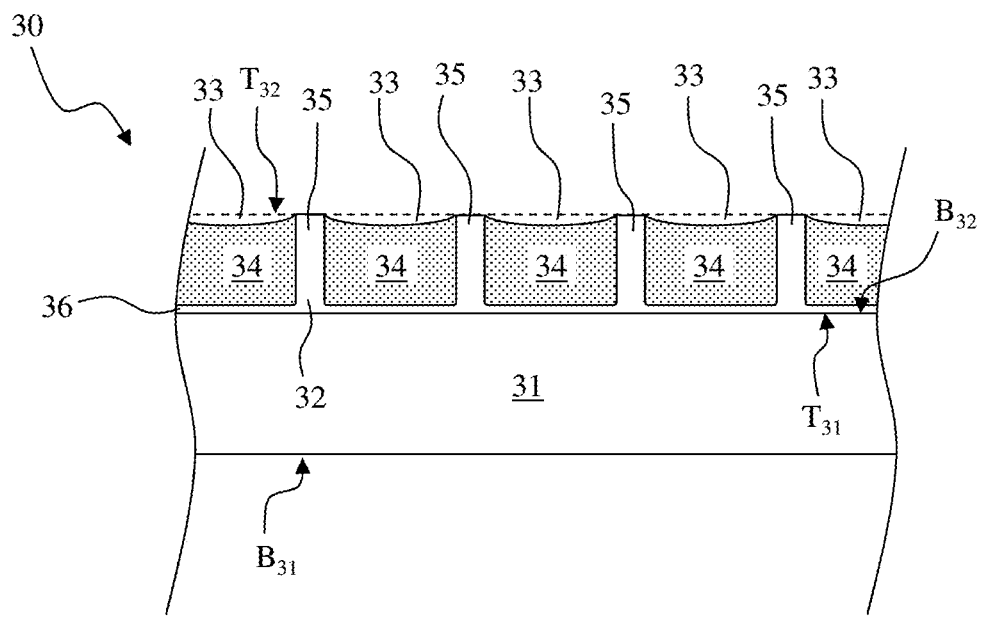
FIG. 3 shows a schematic cross-sectional view of a further embodiment of a heat exchange device.

FIG. 3 shows a schematic cross-sectional view of a further embodiment of a heat exchange device 30.

The heat exchange device 30 comprises a planar substrate 31, preferably a thermally conductive substrate 31, having a bottom surface $B_{31}$ and a top surface $T_{31}$ that are opposite to each other. An intermediate layer 32 is located on top of the substrate 31, and a bottom surface $B_{32}$ of the intermediate layer 32 is at least partially in surface contact with the top surface $T_{31}$ of the substrate 31. Accordingly, the intermediate layer 32 at least partially covers the top surface $T_{31}$ of the substrate 31.

The intermediate layer 32 has a plurality of uniformly shaped openings 33. The openings 33 are filled with an adsorbent material 34. In particular, the spatial extensions of the openings 33 including the lateral extension and depth and the distance between two neighboring openings can be in the respective aforementioned ranges for the heat exchange device 20. For example, the openings 33 are uniformly filled with the adsorbent material 34, as shown in FIG. 3.

For example, the openings $23_1$-$23_4$ have an elongated extension between the outer surface of the intermediate layer 35 and the substrate 31. The elongated extensions essentially run in parallel to one another. In the cross-sectional view the extension is perpendicular to the substrate 31.

Generally, there are no voids or enclosures in the intermediate layer. The intermediate layer 35 material including the openings is generally solid and does not include internal pores.

Figure 4:
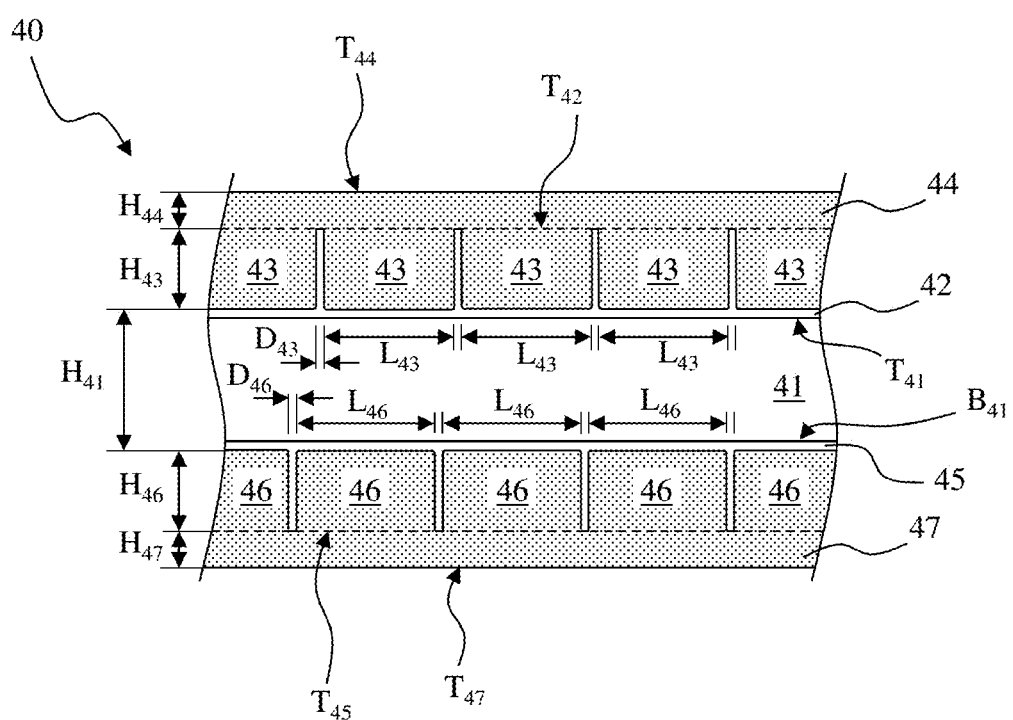
FIG. 4 shows a schematic cross-sectional view of a further embodiment of a heat exchange device.

FIG. 4 shows a schematic cross-sectional view of a further embodiment of a heat exchange device 40.

The heat exchange device 40 comprises a substrate 41. The substrate 41 can be formed planar and comprise a thermally conductive material. For example, the substrate 41 can be at least locally shaped as a plate, sheet, board, wall, etc. For example, the heat exchange device 40 can be a part of in total curved structure, e.g. a curved surface area, a lateral area, etc. In FIG. 4, the substrate 41 is horizontally arranged with a top surface $T_{41}$ and a bottom surface $B_{41}$. The top surface $T_{41}$ and the bottom surface $B_{41}$ are opposite to each other. A thickness of the substrate 41 can be determined by measuring a distance between the top surface $T_{41}$ and the bottom surface $B_{41}$ perpendicular two at least one of the surfaces $T_{41}$, $B_{41}$.

A first intermediate layer 42 is attached to the substrate 41 on the top surface $T_{41}$. The first intermediate layer 42 comprises a plurality of openings 43 that are at least partially uniformly, e.g. cylindrically, shaped. The openings 43 are completely filled with a first adsorbent material 44. The first adsorbent material 44 further covers a top surface $T_{42}$ of the first intermediate layer 42. For example, the openings 43 have a lateral extension $L_{43}$ of 10 to 1,000 nm, a depth $H_{43}$ of 20 to 2,000 nm and a distance $D_{43}$ between two neighboring openings of 20 to 2,000 nm.

A second intermediate layer 45 is attached to the substrate 41 on the bottom surface $B_{41}$. The second intermediate layer 45 comprises a plurality of openings 46 that are completely filled with a second adsorbent material 47. The second adsorbent material 47 further covers a top surface $T_{45}$ of the first intermediate layer 45. For example, the openings 46 have a lateral extension $L_{46}$ of 10 to 1,000 nm, a depth $H_{46}$ of 20 to 2,000 nm and a distance $D_{46}$ between two neighboring openings of 20 to 2,000 nm.

Accordingly, the first intermediate layer 42 and the second intermediate layer 45 are oppositely arranged to each other. Preferably, the first and second intermediate layers 42, 45 comprise oxidized chemical compounds of the substrate material of the substrate 41. For example, the substrate comprises aluminum, while the first and second intermediate layers 42, 45 comprise aluminum oxide. The first and second adsorbent materials 44, 47 are directly attached to the openings 43, 46, in particular without using a binder or an adhesive. The first and second adsorbent materials 44, 47 can be mechanically bound to the openings 43, 46.

The first adsorbent material 44 has a height $H_{44}$ that corresponds to a spatial extension of the first adsorbent material 44 between its top surface $T_{44}$ and the top surface $T_{42}$ of the first intermediate layer 42. The second adsorbent material 47 has a height $H_{47}$ that corresponds to a spatial extension of the second adsorbent material 47 between its top surface $T_{47}$ and the top surface $T_{45}$ of the second intermediate layer 45. A carrier material can be defined as a combined structure of the substrate 41 and bottom portions of the first and second intermediate layers 42, 45. Each of the heights $H_{44}$, $H_{47}$ can be varied between 10% and 200% of a thickness $H_{41}$ of the carrier material.

The first and second adsorbent materials 44, 47 can comprise a same adsorbent material or different adsorbent materials. Preferably, the first and second adsorbent materials 44, 47 comprise a material with a specific surface area of greater than 100 m²/g. For example, the adsorbent materials 44, 47 comprise silicates, zeolites, aluminophosphates, metal-organic frameworks, carbons or salts.

Figure 5:
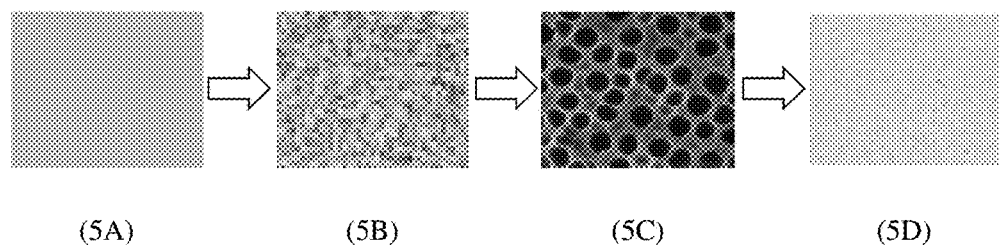
FIG. 5 shows a top view of a further embodiment of a heat exchange device at different stages of manufacturing.

FIG. 5 shows a top view of a further embodiment of a heat exchange device at different stages of manufacturing.

In FIG. 5A, a thermally conductive substrate, e.g. an aluminum plate with a thickness of 5 μm-5 mm is provided. In particular, the thermally conductive substrate is formed as a planar plate with two flat surfaces.

In FIG. 5B, at least one of the two flat surfaces of the substrate is passivated to form a protective layer. For example, the passivation can comprise an electrolytic passivation by anodizing for generating and increasing a thickness of an oxide layer on at least one of the surfaces of the metal substrate. During the anodizing process, the metal substrate acts as an anode electrode of an electrical circuit that is immersed to an electrolyte together with a counter electrode. The electrolyte is, for example, an acid solution containing phosphoric acid. By applying a voltage of 10 V-1,000 V, the electric current can release hydrogen at the counter electrode and oxygen at the surface of the anode electrode. As a result, an oxide layer at the surface of the anode electrode is formed that slowly dissolves in the acidic solution. The dissolution of the oxide by the acid solution is balanced with the oxidation process such that a plurality of nanopores, for example with a lateral extension of 10-150 nm, is formed. The plurality of nanopores allows the electrolyte solution and current to reach the aluminum substrate and continue growing the oxide layer.

Accordingly, a metal oxide layer can be formed by passivating a metal substrate. For example, an aluminum oxide layer is formed by passivating an aluminum substrate. Such a passivated layer can protect an underlying substrate material. The passivated, protective oxide layer of the thermally conductive substrate can be referred to as an intermediate layer. Preferably, the intermediate layer has a plurality of openings, e.g. holes or pores, that is formed by the passivation process. For example, the intermediate layer is a porous layer having a plurality of pores that acts as a plurality of openings. In particular, a lateral extension of the pores and the distance between two neighboring pores may be manipulated by varying a concentration of the acid, a temperature, an applied voltage and a duration of the passivation process.

In FIG. 5C, the plurality of openings at the intermediate layer is widened, i.e. a lateral extension of the openings that are formed during the passivation process as shown in FIG. 5B is increased. In particular, the intermediate layer is treated with an acid solution, e.g. with phosphoric acid, thereby etching the openings. Preferably, the lateral extension of the pores can be manipulated by varying a concentration of the acid in the solution, a temperature, a treatment duration, etc.

In FIG. 5D, an adsorbent material is deposited on the intermediate layer, thereby filling the underlying openings. The part of the adsorbent material that remains on top of the intermediate layer can be either solidified or removed. For example, the openings can be filled with the adsorbent material by impregnating the intermediate layer with a suspension containing adsorbent material in powder form. Further, the openings can be filled with the adsorbent material by in-situ crystallizing the adsorbent material in the openings upon the intermediate layer from a liquid reaction mixture.

In particular, the substrate is chemically and mechanically protected by the passivated, intermediate layer during both the widening process of the openings and the deposition process of the adsorbent material. Furthermore, the intermediate layer can protect the substrate during operation of the heat exchange device.

The passivation and widening processes of the intermediate layer can take place before or after the assembly of the heat exchange device.

Figure 6:
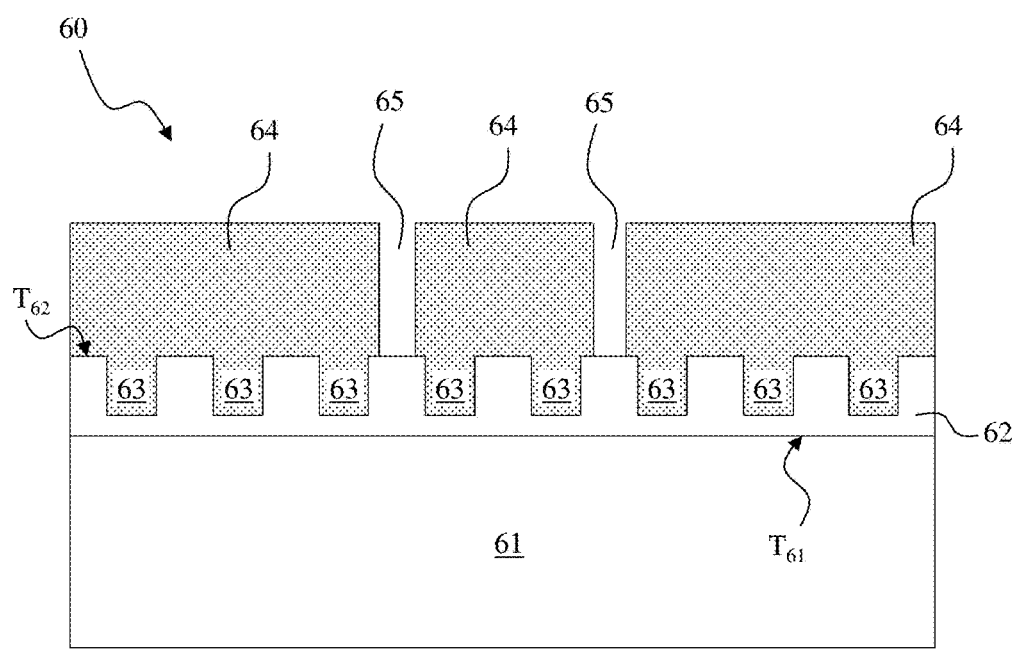
FIG. 6 shows a schematic cross-sectional view of a further embodiment of a heat exchange device.

FIG. 6 shows a schematic cross-sectional view of a further embodiment of a heat exchange device 60.

The heat exchange device 60 comprises a substrate 61, in particular a thermally conductive substrate 61, having a flat top surface $T_{61}$. An intermediate layer 62 having a plurality of openings 63 is attached to the top surface $T_{61}$ of the substrate 61 so as to be in surface contact with the top surface $T_{61}$. The intermediate layer 62 is covered with an adsorbent material 64 that completely fills the plurality of openings 63. During a drying process, the adsorbent material 64 can contract and form trenches 65 that expose parts of the top surface $T_{62}$ of the intermediate layer 62.

Figure 7:
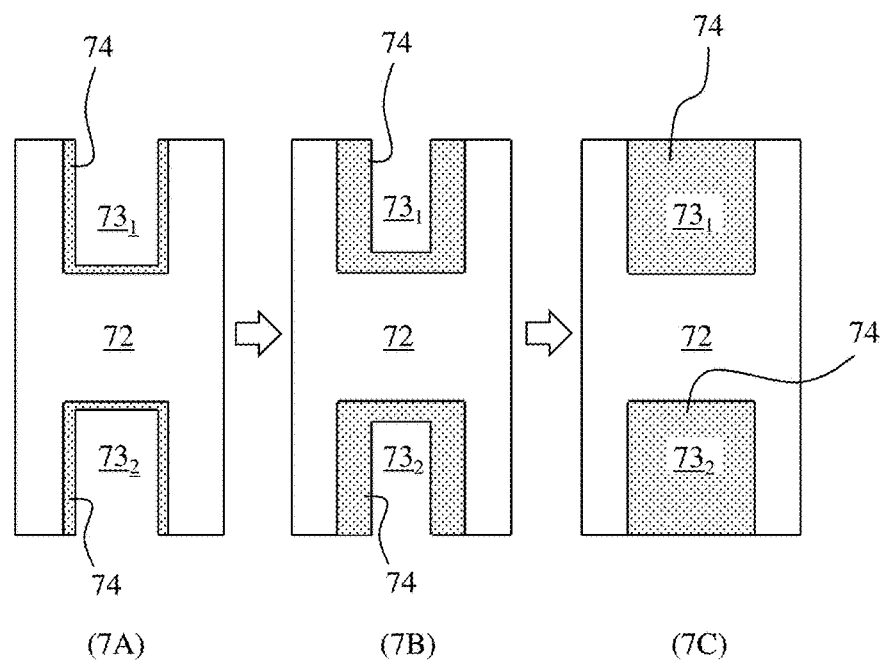
FIG. 7 shows schematic cross-sectional views of differently filled pores in an intermediate layer.

FIG. 7 shows schematic cross-sectional views of differently filled pores in an intermediate layer.

In particular, FIG. 7 shows two pores $73_1$, $73_2$ at different stages of a growth of an adsorbent material 74 in the pores $73_1$, $73_2$. An adsorbent material 74 can be generated and grown in openings $73_1$, $73_2$ by depositing, adhering, sedimenting, etc. In particular, the adsorbent material 74 can be grown inside the openings $73_1$, $73_2$ in a synthesize process, as illustrated in FIG. 7A-7C.

In FIG. 7A, the adsorbent material 74 is synthesized inside the openings $73_1$, $73_2$ on an inner wall of the openings $73_1$, $73_2$. For example, silica gel can be synthesized by mixing tetraethyl orthosilicate (TEOS) and cetyltrimethylammonium bromide (CTAB) together in an acidic solution. A nucleation preferably occurs along a boundary surface between the solution and a solid body. Accordingly, a heterogeneous nucleation takes place along the inner walls of the openings $73_1$, $73_2$, as illustrated in FIG. 7A.

In FIG. 7B, the adsorbent material 74 is grown and a thickness of the adsorbent material increases perpendicular to the underlying inner wall of the openings $73_1$, $73_2$.

In FIG. 7C, as the growth of the adsorbent material 74 continues, the openings $73_1$, $73_2$ are completely filled with the adsorbent material 74.

In particular, the intermediate layer 72 can be formed as a porous layer having a plurality of pores forming the plurality of openings $73_1$, $73_2$.

Figure 8:
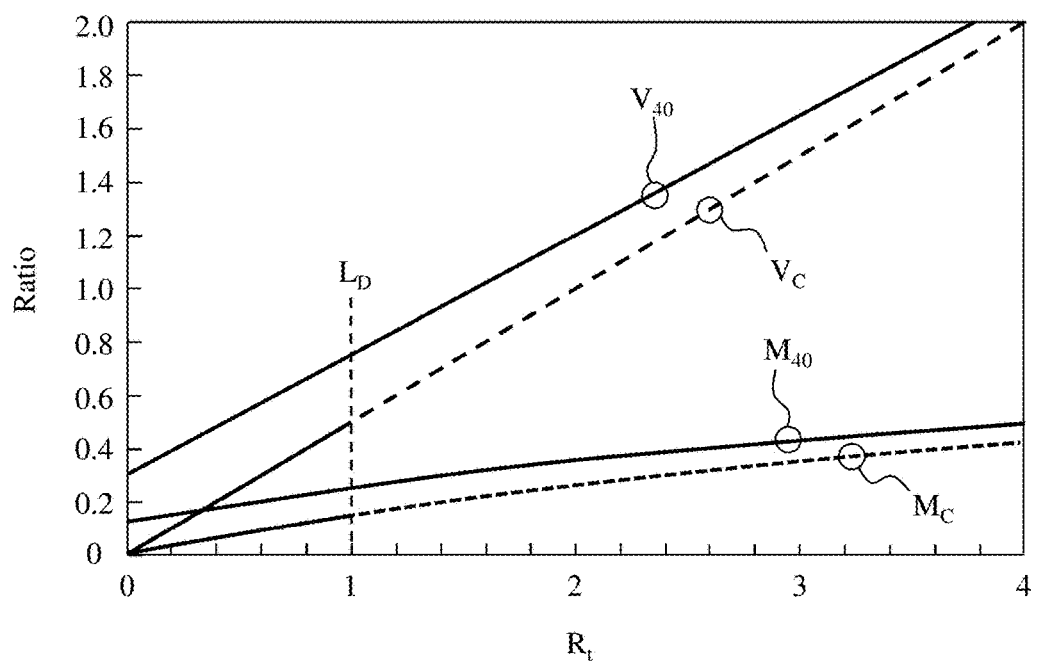
FIG. 8 schematically shows a volume and a mass fraction of an adsorbent material as a function of a ratio of a thickness of the adsorbent material to a thickness of a substrate.

FIG. 8 schematically shows a volume fraction $V_{40}$ and a mass fraction $M_{40}$ of the adsorbent materials 44, 47 as a function of a thickness ratio $R_t$.

In FIG. 8, an x-coordinate represents the thickness ratio $R_t$. A combined height of the adsorbent materials 44, 47 corresponds to a height of a part of the adsorbent materials 44, 47 that covers the intermediate layers 42, 45, respectively. Accordingly, the combine height refers to a sum of the heights $H_{44}$, $H_{47}$ in FIG. 4. The thickness ratio $R_t$ refers to a ratio of the combined height of the adsorbent materials 44, 47 to the thickness $H_{41}$ of the carrier material including substrate 41 and the bottom portions of the intermediate layers 42, 45. Accordingly, the thickness ratio $R_t$ can be calculated by dividing the combined height $H_{44}+H_{47}$ by the thickness $H_{41}$ of the carrier material. A y-coordinate represents a ratio of the adsorbent materials 44, 47 to the carrier material with respect to both volume and mass.

In FIG. 8, graphs $V_C$ represents a volume fraction, and $M_C$ represents a mass fraction of a conventional heat exchange device that involves coating of adsorbent material using a binder. The coated adsorbent material tends to detach from a substrate when a ratio of a thickness of the adsorbent material to a thickness of the substrate exceeds a value, which is termed a delamination limit $L_D$. The delamination limit $L_D$ can correspond to a thickness ratio, at which the thickness of the coated layer exceeds the thickness of the substrate. Beyond the delamination limit $L_D$, the mechanical stability of the said conventional heat exchange device can be impaired, and a higher value of thickness ratio $R_t$ can often be not practicable.

For example, the volume ratio $V_{40}$ and the mass ratio $M_{40}$ of the heat exchange device 40 exceed the volume fraction $V_C$ and the mass fraction $M_C$, respectively, at any thickness ratio $R_t$. Additionally, the heat exchange device 40 can be operable even beyond the delamination limit $L_D$, indicating that the adsorbent materials 44, 47 that cover the intermediate layers 42, 45 can grow beyond the thickness of the substrate 41, i.e. $R_t$ becomes greater than 1, without losing the mechanical stability of the heat exchange device 40. In other words, the thickness ratio of the adsorbent material to the thickness of the carrier material can be 1 or more. Further, the adsorbent materials 44, 47 can be grown to such an extent that a volume of the adsorbent materials 44, 47 exceeds a volume of the carrier material.

FIG. 9 to FIG. 13 show schematic cross-sectional views of a further embodiment of a heat exchange device 90 at different manufacturing stages.

Figure 9:
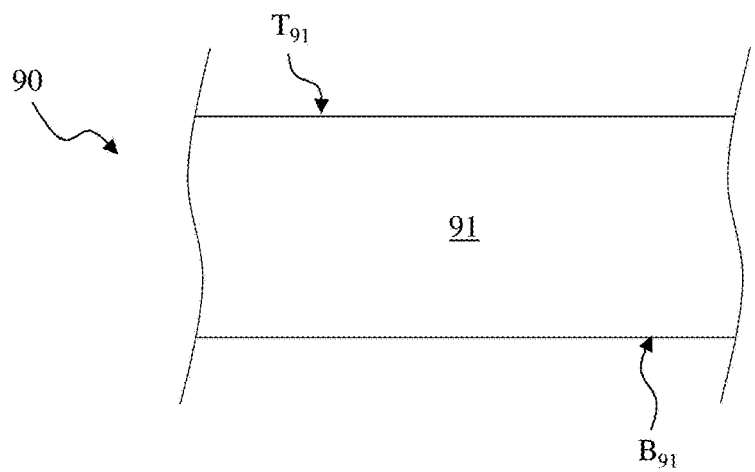
FIG. 9 to FIG. 13 shows schematic cross-sectional views of a further embodiment of a heat exchange device at different manufacturing stages.

In FIG. 9, a substrate 91 is provided. Preferably, the substrate 91 is a thermally conductive substrate. In particular, the substrate 91 is planar-shaped and horizontally arranged with a top surface $T_{91}$ and a bottom surface $B_{91}$ that are opposite to each other. For example, the substrate 91 is an aluminum plate.

Figure 10:
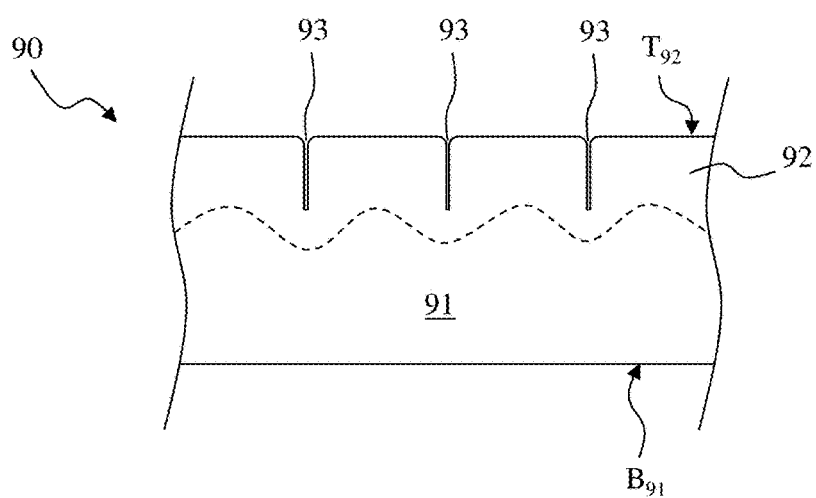

In FIG. 10, the substrate 91 is passivated, in particular electrically passivated in an anodizing process. As a result, an oxide layer is formed at the surface $T_{91}$ of the substrate 91, that forms an intermediate layer 92. The top surface $T_{91}$ becomes a top surface $T_{92}$ of the intermediate layer 92. Additionally, openings 93 are formed at the surface $T_{91}$ that are elongated toward the substrate 91.

Figure 11:
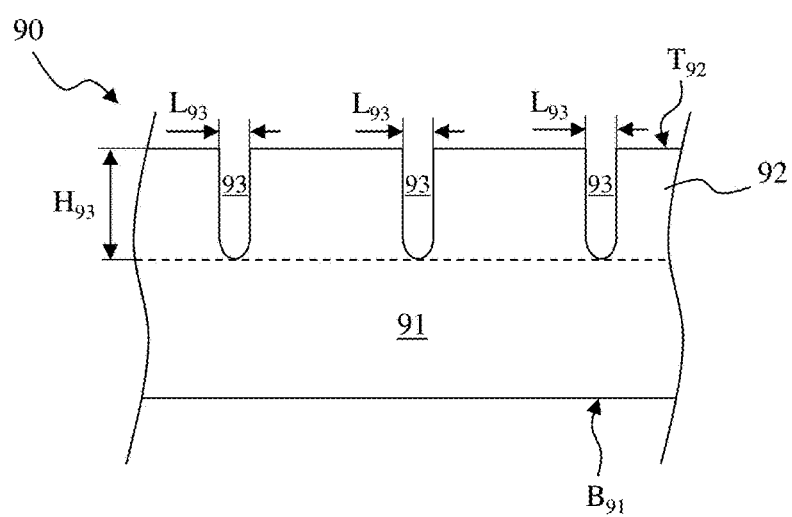

In FIG. 11, the intermediate layer 92 has reached a required depth $H_{93}$ and the openings 93 are widened, i.e. a lateral extension $L_{93}$ of the openings 93 increases. The widening process of the openings 93 can comprise an acid treatment, for example, using a phosphoric acid ($H_3PO_4$). Along the process depicted in FIG. 9-11, first the openings 93 grow along their main axis (FIGS. 9 and 10), and then eventually their cross-sectional dimension increases laterally, i.e. perpendicular to the main axis (FIG. 11) to form their elongated shape. Their main axes essentially run in parallel to one another.

Figure 12:
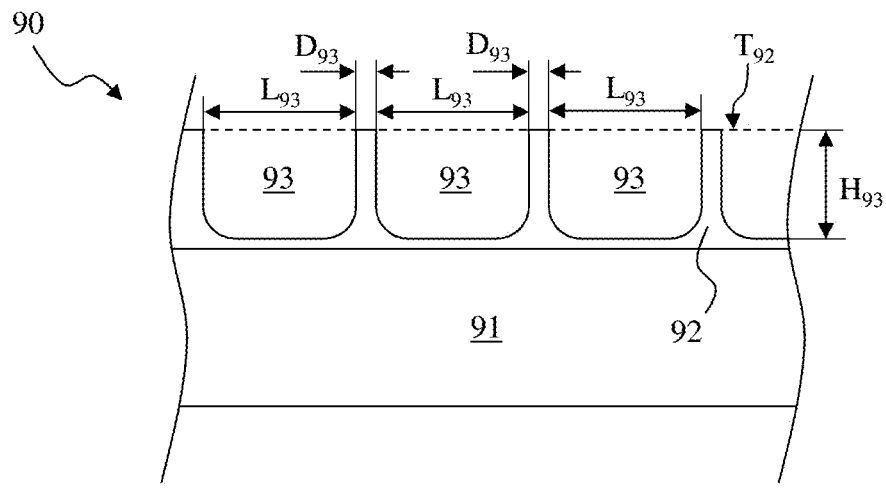

In FIG. 12, the openings $93_1$-$93_3$ reaches a required lateral extension $L_{93}$. Additionally, parameters such as an acid concentration, a temperature and a duration during the widening process can be varied for manipulating a distance $D_{93}$ between two neighboring openings 93.

Figure 13:
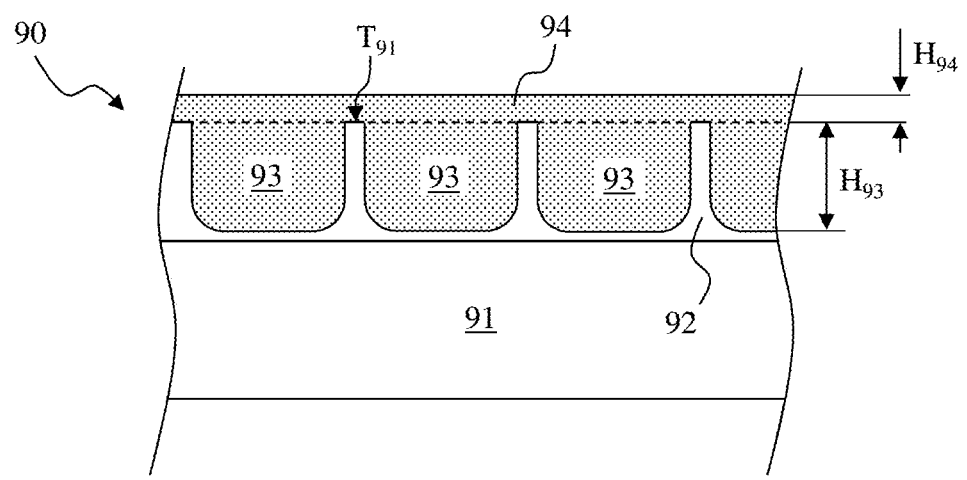

In FIG. 13, an adsorbent material 94 is deposited on the intermediate layer 92 so as to fill the openings $93_1$-$93_3$ completely. Additionally, the adsorbent material 94 at least partially covers the top surface $T_{92}$ of the intermediate layer 92 and rises over the top surface $T_{92}$ by a height $H_{94}$.

The described method with respect to FIG. 9-13 can be performed accordingly at the bottom surface $B_{91}$ of the substrate 91 as to build two intermediate layers on both sides $T_{91}$, $B_{91}$ of the substrate 91.

Heat exchange devices according to embodiments of the invention may be implemented in chemical reactors including fixed-bed, temperature-swing, pressure-swing, vacuum-swing or isothermal chemical reactors with or without catalysts. For example, the heat exchange devices may be operated for carbon dioxide removal in oil refineries, ammonia synthesis or hydrogen economy, generation of nitrogen and oxygen from air and adsorption heat pumps using waste or renewable heat sources. Further potential application of the heat exchange devices includes heat utilization from co-generation plants or industrial waste heat, decoupling of cooling demand from electricity consumption and energy hubs.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS

10 heat exchange device
11 thermally conductive substrate
12 intermediate layer
$13_1$-$13_4$ opening
$14_1$-$14_4$ adsorbent material
20 heat exchange device
21 thermally conductive substrate
22 intermediate layer
$23_1$-$23_4$ opening
$24_1$-$24_4$ adsorbent material
30 heat exchange device
31 thermally conductive substrate
32 intermediate layer
33 opening
34 adsorbent material
40 heat exchange device
41 thermally conductive substrate
42 intermediate layer
43 opening
44 adsorbent material
60 heat exchange device
61 thermally conductive substrate
62 intermediate layer
63 opening
64 adsorbent material
72 intermediate layer
$73_1$, $73_2$ opening
74 adsorbent material
90 heat exchange device
91 thermally conductive substrate
92 intermediate layer
93 opening
94 adsorbent material
$B_{11}$-$B_{91}$ bottom surface
$D_{23}$-$D_{93}$ distance
$H_{23}$-$H_{93}$ height, depth
$L_{23}$-$L_{93}$ lateral extension
$M_{40}$, $M_C$ mass fraction
$R_t$ thickness ratio
$T_{11}$-$T_{91}$ top surface
$V_{40}$, $V_C$ volume fraction

The invention claimed is:

1. A heat exchange device, comprising:
a thermally conductive substrate having opposing top planar and bottom planar surfaces,
a first intermediate layer formed on said top planar surface of said substrate, said first intermediate layer having a planar top surface,
a second intermediate layer formed on said bottom planar surface of said substrate, said second intermediate layer having a planar top surface, and
an adsorbent material,
wherein a plurality of openings is formed at said planar top surface of the first intermediate layer and said planar top surface of the second intermediate layer, said openings having an elongated shape in a direction from an outer surface of the intermediate layer towards the thermally conductive substrate, and wherein the adsorbent material completely fills the plurality of openings formed at said top planar surfaces of said first intermediate layer and completely fills openings formed at said top planar surface of said second intermediate layer, and forms a first additional layer of absorbent material above the planar top surface layer of said first intermediate layer and forms a second additional layer of absorbent material above the planar top surface layer of said second intermediate layer, wherein the first and second intermediate layers comprises an intermediate layer material, the thermal conductive substrate comprises a substrate material, and a thickness ratio comprising a thickness of the first additional layer of adsorbent material combined with a thickness of the second additional layer of adsorbent material relative to the combined thickness of bottom portions of the intermediate layer material and the thickness of the substrate material exceeds 1.

2. The heat exchange device according to claim 1, wherein
each opening of a selection of the openings has an elongated shape in a same direction.

3. The heat exchange device according to claim 1, wherein
the intermediate layer is a porous layer with a plurality of pores forming the plurality of openings.

4. The heat exchange device according to claim 1, wherein
the plurality of openings is formed at a distal surface of the intermediate layer with respect to the thermally conductive substrate.

5. The heat exchange device according to claim 1, wherein
the thermal conductive substrate comprises a substrate material, and
the intermediate layer comprises an oxidized chemical compound of the substrate material.

6. The heat exchange device according to claim 1, wherein
the adsorbent material is directly attached to the intermediate layer.

7. The heat exchange device according to claim 1, wherein
the thermally conductive substrate comprises at least one of the group of: aluminum, aluminum alloy, titanium, and titanium alloy.

8. The heat exchange device according to claim 1, wherein
the adsorbent material comprises at least one of the group of: silicates, zeolites, aluminophosphates, metal-organic frameworks, carbons or salts.

9. The heat exchange device according to claim 1, wherein
the adsorbent material has a specific surface area of greater than 100 $m^2/g$.

10. The heat exchange device according to claim 1, wherein
each opening of the plurality of openings axially extends in a direction having an angle less than 40° with a normal vector that is perpendicular to a surface of the thermally conductive substrate.

11. The heat exchange device according to claim 1, wherein
at least 50% of openings of the plurality of openings have a lateral extension of 10 nanometers to 1000 nanometers.

* * * * *